United States Patent
Stockton et al.

(10) Patent No.: US 9,430,655 B1
(45) Date of Patent: Aug. 30, 2016

(54) SPLIT TOKENIZATION

(71) Applicant: EMC Corporation, Hopkinton, MA (US)

(72) Inventors: Rachael Stockton, Newton, MA (US); Marten van Dijk, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 556 days.

(21) Appl. No.: 13/729,155

(22) Filed: Dec. 28, 2012

(51) Int. Cl.
*G06F 21/60* (2013.01)
*H04L 9/08* (2006.01)
*G06Q 20/38* (2012.01)

(52) U.S. Cl.
CPC ............. *G06F 21/602* (2013.01); *H04L 9/085* (2013.01); *H04L 9/0861* (2013.01); *G06Q 20/382* (2013.01); *G06Q 20/3827* (2013.01); *G06Q 20/3829* (2013.01); *H04L 9/0869* (2013.01)

(58) Field of Classification Search
CPC ... H04L 9/085; H04L 9/0861; H04L 9/0869; H04L 9/0888; H04L 9/0894; G06Q 20/382; G06Q 20/3829; G06Q 20/3827; G06F 21/602
See application file for complete search history.

(56) References Cited

U.S. PATENT DOCUMENTS

| | | | | |
|---|---|---|---|---|
| 6,810,122 B1* | 10/2004 | Miyazaki et al. | | 380/30 |
| 6,996,724 B2* | 2/2006 | Murakami et al. | | 713/193 |
| 7,386,131 B2* | 6/2008 | Jing et al. | | 380/278 |
| 7,391,865 B2* | 6/2008 | Orsini et al. | | 380/201 |
| 7,688,975 B2* | 3/2010 | Lin et al. | | 380/44 |
| 8,085,938 B2* | 12/2011 | Kagaya et al. | | 380/286 |
| 8,275,124 B2* | 9/2012 | Kurihara et al. | | 380/28 |
| 2002/0164033 A1* | 11/2002 | Rajasekaran | | 380/278 |
| 2003/0208761 A1* | 11/2003 | Wasserman et al. | | 725/53 |
| 2004/0030932 A1* | 2/2004 | Juels et al. | | 713/202 |
| 2004/0103276 A1* | 5/2004 | Jing et al. | | 713/156 |
| 2006/0072744 A1* | 4/2006 | Ogihara et al. | | 380/28 |
| 2006/0129502 A1* | 6/2006 | Pastusiak et al. | | 705/71 |
| 2006/0177061 A1* | 8/2006 | Orsini et al. | | 380/268 |
| 2007/0160197 A1* | 7/2007 | Kagaya et al. | | 380/28 |
| 2007/0223706 A1* | 9/2007 | Gantman et al. | | 380/286 |
| 2008/0082817 A1* | 4/2008 | Takahashi et al. | | 713/155 |
| 2008/0229106 A1* | 9/2008 | Nishiguchi et al. | | 713/171 |
| 2008/0232580 A1* | 9/2008 | Hosaka et al. | | 380/28 |
| 2008/0301775 A1* | 12/2008 | Ollikainen et al. | | 726/3 |
| 2008/0313456 A1* | 12/2008 | Menadue et al. | | 713/156 |
| 2009/0144543 A1* | 6/2009 | Fujii et al. | | 713/160 |
| 2009/0271847 A1* | 10/2009 | Karjala et al. | | 726/6 |
| 2009/0313687 A1* | 12/2009 | Popp et al. | | 726/9 |
| 2010/0031128 A1* | 2/2010 | Obana | | 714/784 |
| 2010/0217978 A1* | 8/2010 | Schneider | | 713/168 |
| 2010/0217986 A1* | 8/2010 | Schneider | | 713/171 |

(Continued)

*Primary Examiner* — Eleni Shiferaw
*Assistant Examiner* — Nelson Giddins
(74) *Attorney, Agent, or Firm* — BainwoodHuang

(57) ABSTRACT

An improved technique involves providing protection of secrets by splitting the secret into secret shares and providing tokens for each secret share. Along these lines, a terminal splits a secret such as a credit card number into shares. The terminal then transmits each share to a separate and distinct token server. Each token server, upon receiving a secret share, generates a corresponding token and sends that token to an application server. In some cases, when a user at the application server requires access to the secret, the application server sends each token to the token server form which the token was generated. The token servers each send, in return, a secret share to the application server. The application server combines the secret shares to recover the secret.

22 Claims, 8 Drawing Sheets

(56) References Cited

U.S. PATENT DOCUMENTS

| | | | |
|---|---|---|---|
| 2010/0299313 A1* | 11/2010 | Orsini et al. | 707/652 |
| 2011/0022883 A1* | 1/2011 | Hansen | 714/4 |
| 2011/0126291 A1* | 5/2011 | Araki | 726/26 |
| 2011/0135094 A1* | 6/2011 | Muto et al. | 380/270 |
| 2011/0271099 A1* | 11/2011 | Preiss et al. | 713/155 |
| 2011/0295967 A1* | 12/2011 | Wang et al. | 709/212 |
| 2011/0296440 A1* | 12/2011 | Laurich et al. | 719/326 |
| 2011/0314280 A1* | 12/2011 | Nonaka et al. | 713/168 |
| 2012/0163592 A1* | 6/2012 | Bellare et al. | 380/44 |
| 2012/0226904 A1* | 9/2012 | Orsini et al. | 713/167 |
| 2012/0255030 A1* | 10/2012 | Matsuo | 726/26 |
| 2013/0013931 A1* | 1/2013 | O'Hare et al. | 713/189 |
| 2013/0018903 A1* | 1/2013 | Taranov | 707/756 |
| 2013/0227649 A1* | 8/2013 | Liu et al. | 726/3 |
| 2013/0272521 A1* | 10/2013 | Kipnis et al. | 380/44 |
| 2014/0013439 A1* | 1/2014 | Koike | 726/26 |
| 2014/0059213 A1* | 2/2014 | Ollikainen et al. | 709/224 |
| 2014/0068253 A1* | 3/2014 | Oida et al. | 713/164 |
| 2014/0092890 A1* | 4/2014 | Lee et al. | 370/338 |
| 2014/0280342 A1* | 9/2014 | Litherland et al. | 707/780 |
| 2014/0359290 A1* | 12/2014 | McCusker et al. | 713/168 |

* cited by examiner

SPLIT TOKENIZATION

BACKGROUND

Some conventional secure computer systems protect a secret by exchanging a token for that secret. For example, suppose that a merchant accepts credit cards for payment. For such a merchant, locally storing customers' credit card numbers carries a risk of exposing those credit card numbers to an adversary. The merchant can replace each credit card number with a corresponding token, or a number meaningless to the adversary, generated by a secure tokenization server. The merchant would then recover a credit card number by sending the corresponding token back to the tokenization server.

The tokenization server generates tokens from secrets in such a way that an adversary would have very little chance in deducing the secret from the token. For example, the tokenization server can generate a token from a credit card number by applying a cryptographic function to the credit card number. Such a cryptographic function relies on a key which is used to recover the credit card number from the token. The tokenization server can also use a lookup table in a database to recover the credit card number from the token.

SUMMARY

Unfortunately, there are deficiencies with the above-described conventional secure computer systems. For example, an adversary may compromise the tokenization server in order to illicitly gain access to secrets stored there. Along the lines of the above example, if such an adversary were to gain access to a key used in a cryptographic function for generating tokens, that adversary could compromise credit card numbers from any tokens generated from that key. Further, that adversary could also compromise credit card numbers taken from a database on the tokenization server.

In contrast to the conventional secure computer systems having a tokenization server that stores secrets that can be compromised by a single illicit access of the tokenization server, an improved technique involves providing protection of secrets by splitting the secret into secret shares and providing tokens for each secret share. Along these lines, a terminal splits a secret such as a credit card number into shares. The terminal then transmits each share to a separate and distinct token server. Each token server, upon receiving a secret share, generates a corresponding token and sends that token to an application server. In some cases, when a user at the application server requires access to the secret, the application server sends each token to the token server form which the token was generated. The token servers each send, in return, a secret share to the application server. The application server combines the secret shares to recover the secret.

Advantageously, the improved technique creates conditions in which an adversary has a much smaller chance of retrieving a secret because that secret is split among several token servers. For example, if the adversary can access a token server with probability $\rho$, then that adversary may access two token servers with probability $\rho^2 < \rho$. Further, the chance of such an adversary successfully compromising the secret may be further reduced by proactively updating the shares in such a way as to preserve the secret.

One embodiment of the improved technique is directed to a method of protecting a secret. The method includes performing a secret splitting operation that produces a first secret share and a second secret share. The method also includes sending the first secret share to a first token server, the first token server being constructed and arranged to i) generate a first token from the first secret share and ii) send the first token to an application server. The method further includes sending the second secret share to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server.

Another embodiment of the improved technique is directed to a method of recovering a secret. The method includes sending a first token to a first token server, the first token server being constructed and arranged to generate a first secret share in response to receiving the first token, the first secret share being based on the first token. The method also includes sending a second token to a second token server, the second token server being constructed and arranged to generate a second secret share in response to receiving the second token, the second secret share being based on the second token. The method further includes receiving the first secret share from the first token server and receiving the second secret share from the second token server. The method further includes performing a combination operation on the first secret share and the second secret share to produce the secret.

Additionally, some embodiments of the improved technique are directed to a system constructed and arranged to protect a secret. The system includes a network interface, memory, and a controller including controlling circuitry constructed and arranged to carry out the method of protecting a secret.

Furthermore, some embodiments of the improved technique are directed to a computer program product having a non-transitory computer readable storage medium which stores code including a set of instructions to carry the method of protecting a secret.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves providing protection of secrets by splitting the secret into secret shares and providing tokens for each secret share. Along these lines, a terminal splits a secret such as a credit card number into shares. The terminal then transmits each share to a separate and distinct token server. Each token server, upon receiving a secret share, generates a corresponding token and sends that token to an application server. In some cases, when a user at the application server requires access to the secret, the application server sends each token to the token server form which the token was generated. The token servers each send, in return, a secret share to the application server. The application server combines the secret shares to recover the secret.

Advantageously, the improved technique creates conditions in which an adversary has a much smaller chance of retrieving a secret because that secret is split among several token servers. For example, if the adversary can access a token server with probability $\rho$, then that adversary may access two token servers with probability $\rho^2 < \rho$. Further, the chance of such an adversary successfully compromising the secret may be further reduced by proactively updating the shares in such a way as to preserve the secret.

Figure 1:
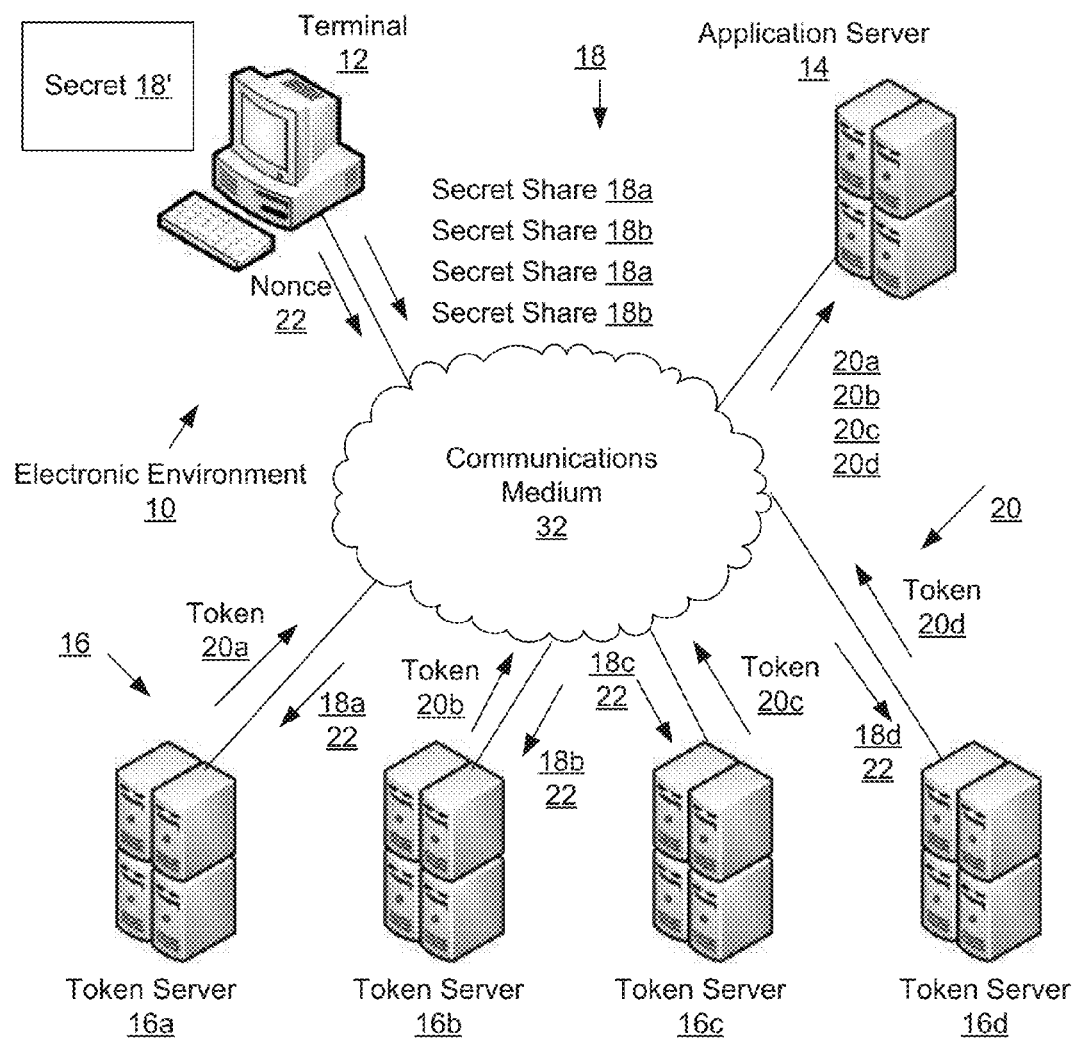
FIG. 1 is a block diagram illustrating an example electronic environment for carrying out an aspect of the improved technique.

FIG. 1 illustrates an example electronic environment 10 for carrying out the improved technique. Electronic environment 10 includes terminal 12, application server 14, token server 16a, 16bm 16c, 16d (token servers 16), and communications medium 32.

Terminal 12 is configured to accept a secret 18' such as a credit card number from a user (not pictured). Terminal 12 is further configured to split secret 18 into a set of secret shares 18a, 18b, 18c, 18d (secret shares 18) and send secret shares 18 to corresponding token servers 16. In some arrangements, such as in an on-line shopping scenario, terminal 12 takes the form of a desktop computer. In other arrangements, such as in a brick-and-mortar shopping scenario, terminal 12 takes the form of a credit card reader.

Application server 14 is configured to receive tokens 20a, 20b, 20c, and 20d (tokens 20) from token servers 16. Application server 14 typically takes the form of a web server, although, in some arrangements, application server may be a desktop computer.

Token servers 16a, 16b, 16c, and 16d (token server 16) are configured to receive a secret share 18a, 18b, 18c, or 18d, respectively, and generate a token 20a, 20b, 20c, or 20d, respectively, from corresponding secret share 18. Token servers 16 are further configured to send tokens 20 to application server 14.

Communication medium 32 provides network connections between terminal 12, application server 14, and token servers 16. Communications medium 32 may implement a variety of protocols such as TCP/IP, UDP, ATM, Ethernet, Fibre Channel, combinations thereof, and the like. Furthermore, communications media 32 may include various components (e.g., cables, switches/routers, gateways/bridges, NAS/SAN appliances/nodes, interfaces, etc.). Moreover, the communications medium 32 are capable of having a variety of topologies (e.g., queue manager-and-spoke, ring, backbone, multi drop, point to-point, irregular, combinations thereof, and so on).

In some arrangements, communications medium 32 includes a content delivery network (CDN) including a set of Edge servers (not pictured) through which content is routed between terminal 12 and token servers 16.

During operation, terminal 12 receives a secret 18' from a user. For example, terminal 12 receives a credit card number from the user as the user attempts to make a purchase. In some arrangements, the user inputs the credit card number into terminal 12 via an internet browser. In other arrangements, the user inputs the credit card number into terminal 12 via a swiping mechanism in a dedicated device or a smartphone.

Upon receiving secret 18', terminal 12 performs a splitting operation on secret 18' to produce secret shares 18a, 18b, 18c, and 18d such that a combination operation (i.e., an inverse of the splitting operation) recovers secret 18'. For example, suppose that the splitting operation involves generating three random, 16-digit numbers, and then performing a bitwise XOR operation on those three random numbers and a credit card number 18' input into terminal 12 to produce a fourth number. Each of the generated random numbers and the fourth number then is a secret share 18. The credit card number 18' may be recovered by performing the bitwise XOR operation on the secret shares 18. In some arrangements, the Edge servers in the CDN may perform the splitting operation.

Terminal 12 also generates a random nonce 22 along with secret shares 18. Terminal 12 provides random nonce 22 as proof that terminal 12 generated secret shares 18 together.

Upon producing secret shares 18a, 18b, 18c, and 18d, terminal 12 sends each secret share 18 to a corresponding token server 16a, 16b, 16c, or 16d via communications medium 32. Terminal 12 also sends random nonce 22 to each token server 16 with corresponding secret share 18. Terminal 12 also sends a destination address (i.e., IP address) of application server to each token server with random nonce 22 and corresponding secret share 18. In some arrangements, terminal 12 encrypts secret share 18, random nonce 22, and the destination address (i.e., using a public key of the corresponding token server 16) prior to sending. In some arrangements, terminal 12 also send identification information corresponding to the owner of secret 18'.

Token servers 16a, 16b, 16c, and 16d each receive corresponding secret share 18, random nonce 22, and the destination address from terminal 12. In some arrangements, each token server 16 decrypts what was received using a private key corresponding to the public key used for encryption to reveal secret share 18, random nonce 22, and the destination address, Upon receiving secret share 18a, 18b, 18c, or 18d, each token server 16a, 16b, 16c, or 16d generates a corresponding token 20a, 20b, 20c, or 20d. Token server 16 applies a transformation to secret share 18 such as a keyed cryptographic function having a key in order to produce token 20. In some arrangements, upon generating token 20, token server 16 stores the key from the keyed cryptographic function with the stored token in a database (not pictured).

After generating token 20, token server 16 sends token 20 and random nonce 22 to application server 14 at the destination address received from terminal 12. Upon receiving tokens 20, application server stores tokens 20 on an accessible storage device. In some arrangements, application server 14 combines tokens 20 into a single, combined token.

It should be understood that, in some arrangements, each token server 16 sends its corresponding token 20 back to terminal 12. In such a case, terminal 12 sends tokens 20 to application server 14 after receiving tokens 20. Further, terminal 12 need not send a destination address to token servers 16 when sending corresponding secret shares 18.

Figure 2:
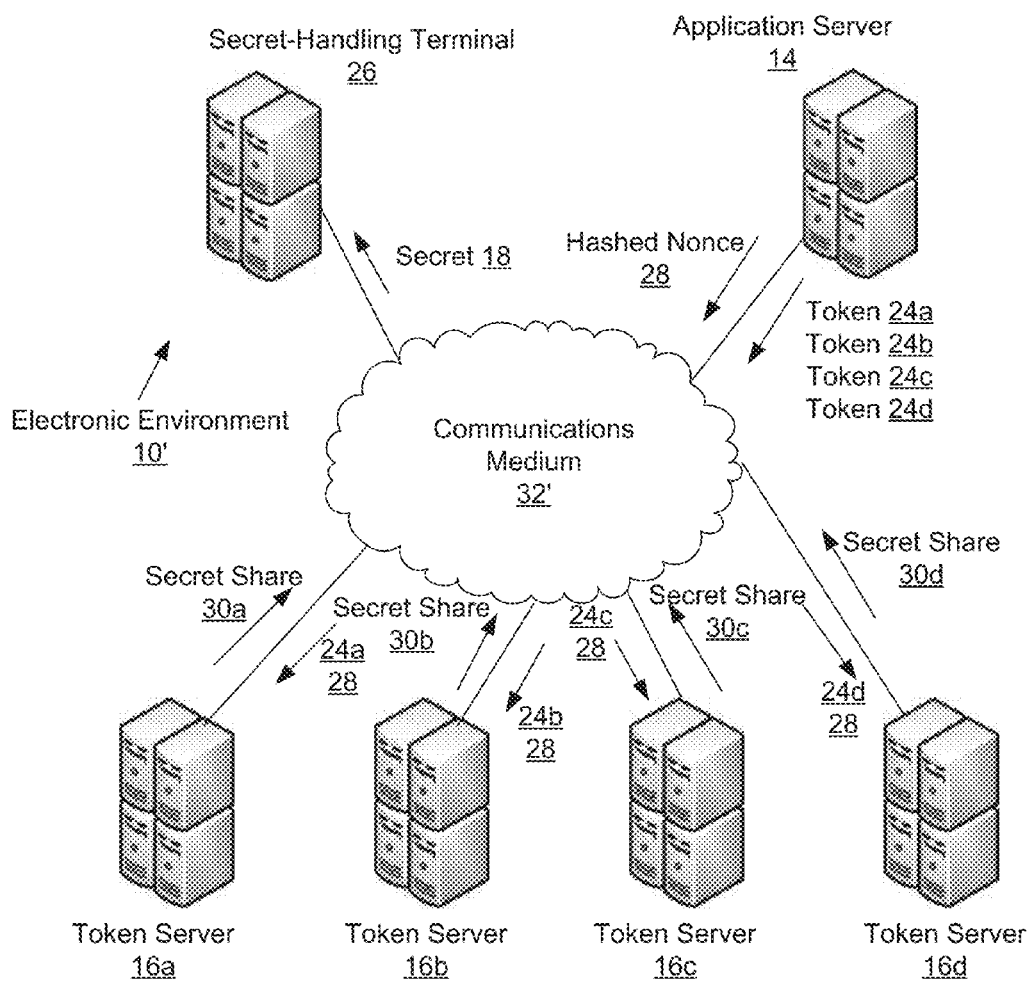
FIG. 2 is a block diagram illustrating an example electronic environment for carrying out another aspect of the improved technique.

FIG. 2 illustrates another example electronic environment 10' for carrying out the improved technique. Electronic environment 10' includes application server 14, token servers 16a, 16bm 16c, 16d (token servers 16), secret-handling terminal 28, and communications medium 32.

Application server 14 is configured to send tokens 24a, 24b, 24c, 24d (tokens 24) to corresponding token server 16a, 16b, 16c, and 16d from which tokens 24 were generated. Application server 14 is further configured to receive secret shares 30a, 30b, 30c, and 30d (secrets shares 30) from corresponding token servers 16. Application server 14 is further configured to combine secret shares 30 to recover secret 18'. In some arrangements, application server is further configured to send secret 18' to a secret-handling terminal 26. As an example, a merchant that recovers a credit card number 18' from tokens 20 would send credit card number 18' to a terminal 26 at a credit card company.

During operation, application server 14 sends tokens 24 and random nonce 22 (see FIG. 1) to corresponding token servers 16 in response to a request to recover secret 18'. Tokens 24 are equivalent to corresponding tokens 20, but in some arrangements, tokens 24 each represent identical, combined tokens. In some arrangements, application server generates a hash of random nonce 22 before transmission to token servers 16.

Upon receiving token 24, corresponding token server 16 recovers secret share 30 from token 24. For example, token server 16 applies a cryptographic function having a key related to the key that used to generate token 20 from secret share 18 to token 24 to recover secret share 30. In some arrangements, token 24 is identical to token 20, and secret share 30 is identical to secret share 18. In other arrangements, however, token 24 results from a combination of tokens 20a, 20b, 20c, and 20d and is identical for all token servers. In still other arrangements, each secret share 30 differs from the corresponding secret share 18 in such a way that a combination operation performed on secret shares 30 still yields secret 18'. Details of such an arrangement are discussed below with respect to FIG. 4.

It should be understood that, as an additional security measure, token servers 16 check each request for secret shares 30 from application server 14 for random nonce 22. Token servers 16 will generate secret shares 30 when random nonce 22 matches that token servers 16 sent to application server 14 along with tokens 20. As illustrated in FIG. 2, token servers 16 generate a hash of random nonce 22 previously stored, and compare this hash to hash 28 sent from application server 14.

It should also be understood that application server 14 may also encrypt tokens 30, random nonce 22 (or its hash), and any identification information pertaining to the owner of secret 18'. Token servers 16 are then configured to decrypt such a transmission using a private key corresponding to a public key used to encrypt the transmission.

When random nonce 22 provides a match, token servers 16 send corresponding token shares 30 to application server 14. Upon receipt of token shares 30, application server 14 performs a combination operation on token shares 30 to produce secret 18'. In some arrangements, application server 14 sends secret 18' to secret-handling terminal 26 and does not store secret 18' on an accessible storage device. Further details of an example combination operation are discussed below with respect to FIG. 3c.

Further details of terminal 12 are discussed below with respect to FIG. 3a below.

Figure 3A:
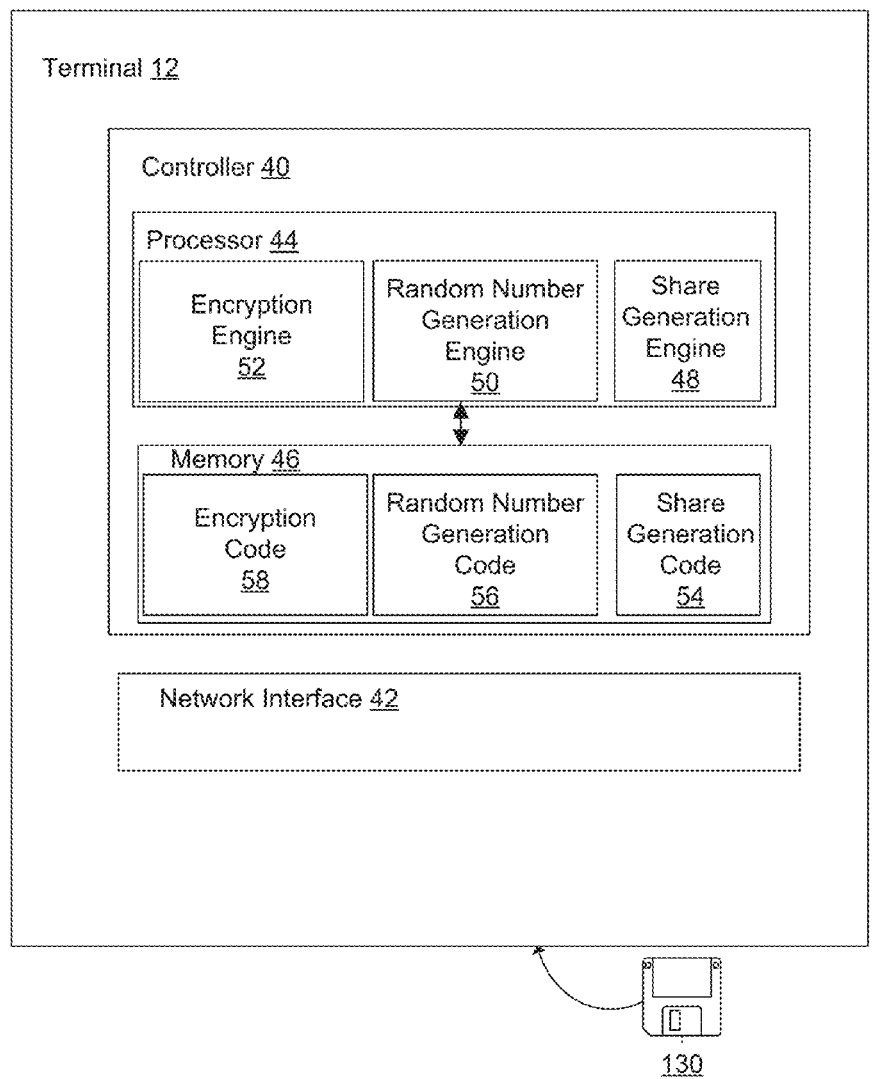
FIG. 3a is a block diagram illustrating an example terminal within the electronic environment shown in FIG. 1.

FIG. 3a illustrates an example terminal 12. Terminal 12 includes controller 40 which in turn includes processor 44 and memory 46, and network interface 42.

Network interface 42 takes the form of an Ethernet card; in some arrangements, network interface 42 takes other forms including a wireless receiver and a token ring card.

Memory 46 is configured to store code which includes share generation code 54, random number generation code 56, and encryption code 58. Memory 46 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from share generation code 54, random number generation code 56, and encryption code 58. Processor 44 includes share generation engine 48, random number generation engine 50, and encryption engine 52 which are configured to execute instructions derived from share generation code 54, random number generation code 56, and encryption code 58, respectively.

During operation, share generation engine 48 generates random shares 18 from secret 18' by performing a splitting operation on secret 18'. In some arrangements, the splitting operation involves generating three random, 16-digit numbers, and then performing a bitwise XOR operation on those three random numbers and a credit card number 18' input into terminal 12 to produce a fourth number. Each of the generated random numbers and the fourth number then is a secret share 18. The credit card number 18' may be recovered by performing the bitwise XOR operation on the secret shares 18.

In other arrangements, however, secret 18' is split into multiplicative factors according to a cyclic group having a particular generator. Further details of such a splitting will be discussed below with respect to FIG. 3b.

Random number generation engine 50 generates random nonce 22. For example, random number generation engine outputs a 256-bit nonce according to a uniform distribution. In some arrangements, random number generation engine 50 generates nonce 22 upon generation of random shares 18; in other arrangements, random number generation engine 50 generates nonce 22 periodically.

Encryption engine 52 then performs an encryption operation on each transmission to token servers 16 that includes a shared secret 18. For example, in some arrangements, processor 44 forms a string by concatenating a shared secret 18, random nonce 22, and a destination address of application server 14. Encryption engine 52 then applies, to the string, a public key corresponding to the private key of the token server 16 to which that secret share 18 is to be transmitted. Processor 44 then sends the encrypted string to a token server 16 via network interface 42.

Further details of each token server 16 are discussed below with respect to FIG. 3b.

Figure 3B:
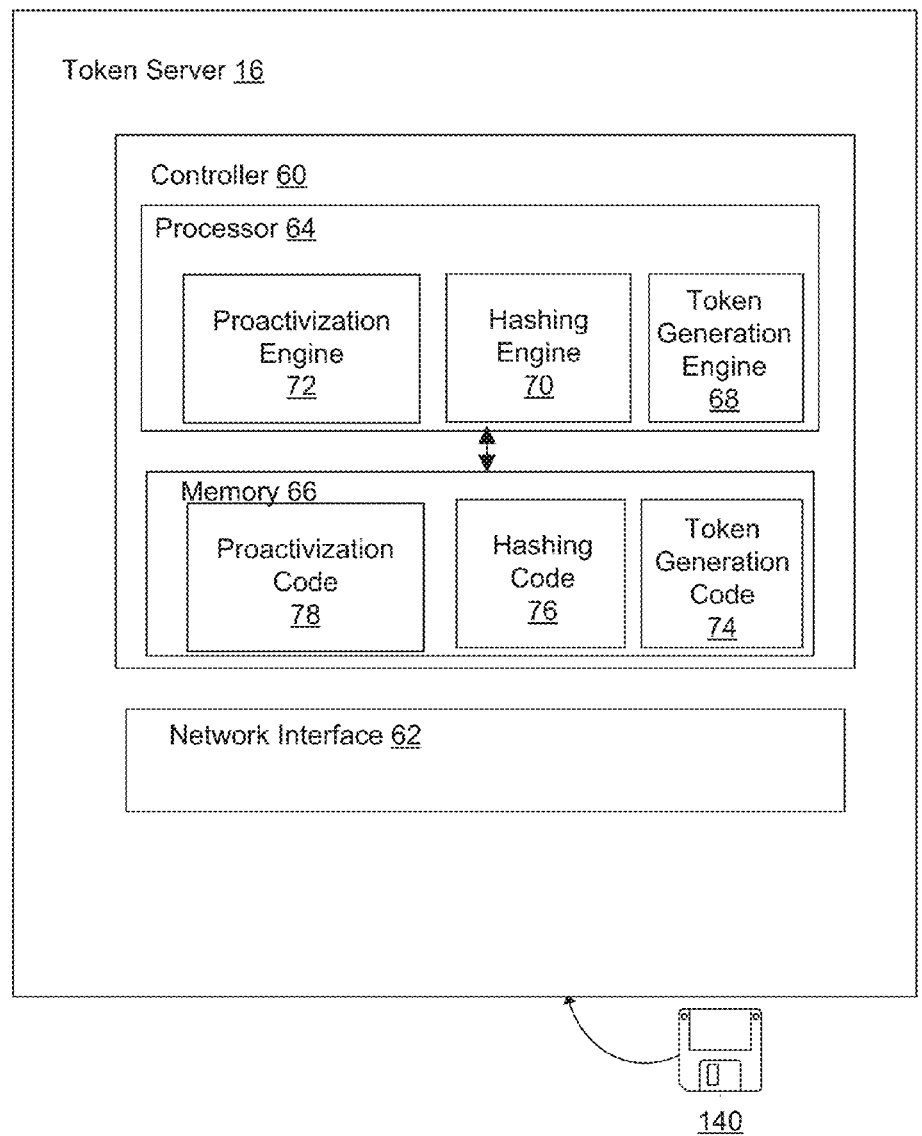
FIG. 3b is a block diagram illustrating an example application server within the electronic environments shown in FIG. 2.

FIG. 3b illustrates an example token server 16. Token server 16 includes controller 60 which in turn includes processor 64 and memory 66, and network interface 62.

Network interface 62 takes the form of an Ethernet card; in some arrangements, network interface 62 takes other forms including a wireless receiver and a token ring card.

Memory 66 is configured to store code which includes token generation code 74, hashing code 76, and proactivization code 78. Memory 66 generally takes the form of, e.g., random access memory, flash memory or a non-volatile memory.

Processor 64 takes the form of, but is not limited to, Intel or AMD-based MPUs, and can include a single or multi-cores each running single or multiple threads. Processor 64 is coupled to memory 66 and is configured to execute instructions from token generation code 74, hashing code 76, and proactivization code 78. Processor 64 includes token generation engine 68, hashing engine 70, and proactivization engine 72 which are configured to execute instructions derived from token generation code 74, hashing code 76, and proactivization code 78, respectively.

During operation, processor 64 receives a secret share 18 via network interface 82. In some arrangements, processor 44 receives an encrypted string that, when decrypted by processor 64 using a private key, reveals secret share 18, random nonce 22, and the destination address of application server 14.

Token generation engine 88 generates a token 20 from secret share 18. In some arrangements, token generation engine 88 corresponding to token server $16^i$, where i∈{a,b,c,d}, utilizes a cryptographic function $T_f(K_i,S_i)$ to generate a token $T_i$, $S_i$ being secret share $18^i$, $K_i$ representing a secret key, and I∈{A,B,C,D} corresponding to i∈{a,b,c,d}. That is, $T_i = T_f(K_i,S_i)$. Token generation engine 88 keeps track of pairs $(K_i,T_i)$ for eventual recovery of a secret share from a token. Hashing engine 70 also generates a hash of nonce 28.

Processor 64 then sends token 20 ($T_i$) and nonce 22 to application server 14. Further details of application server 14 are discussed below with respect to FIG. 3c.

Figure 3C:
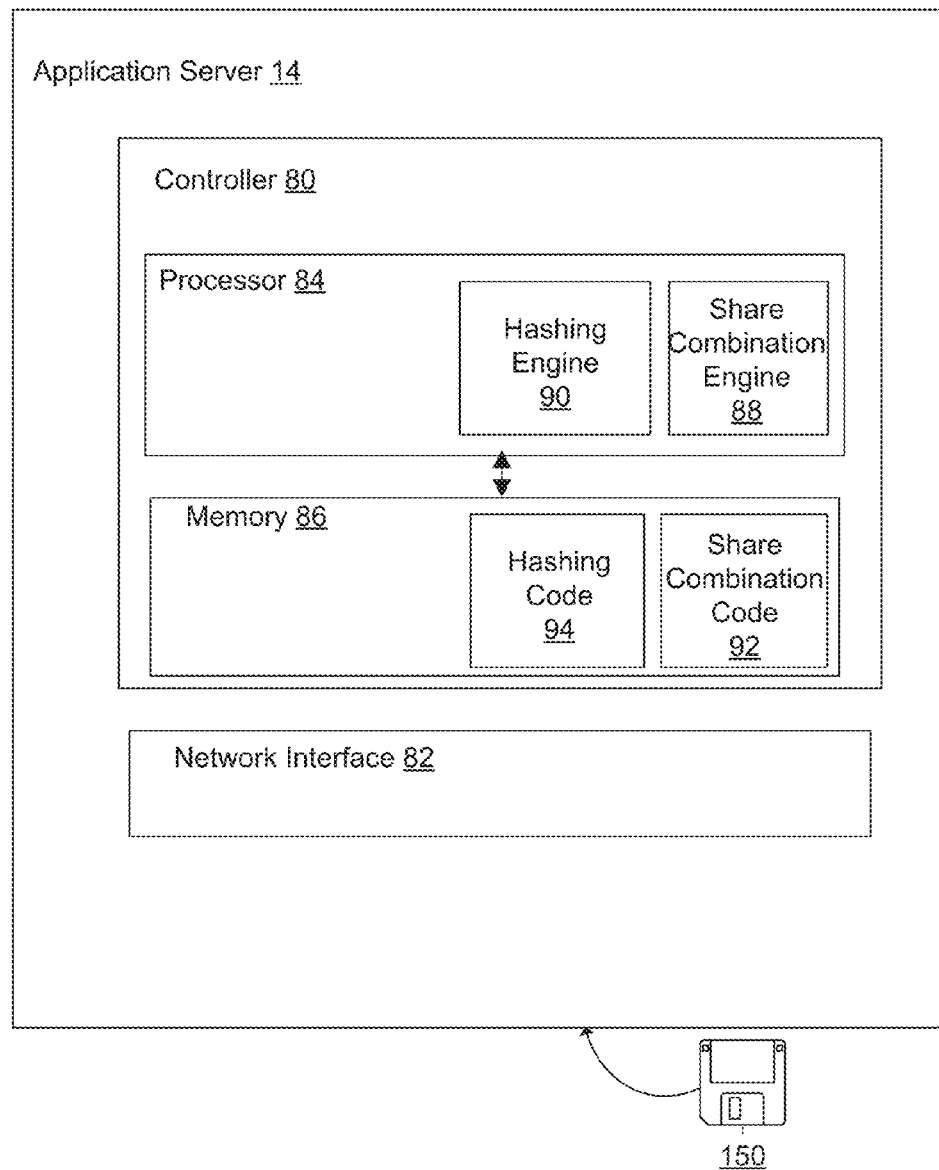
FIG. 3c is a block diagram illustrating an example token server within the electronic environments shown in FIGS. 1 and 2.

FIG. 3c illustrates an example application server 14. Application server 14 includes controller 80 which in turn includes processor 84 and memory 86, and network interface 82.

Network interface 82 takes the form of an Ethernet card; in some arrangements, network interface 82 takes other forms including a wireless receiver and a token ring card.

Memory 86 is configured to store code which includes share combination code 92 and hashing code 94. Memory 86 generally takes the form of, e.g., random access memory, flash memory or a non-volatile memory.

Processor 84 takes the form of, but is not limited to, Intel or AMD-based MPUs, and can include a single or multi-cores each running single or multiple threads. Processor 84 is coupled to memory 86 and is configured to execute instructions from share combination code 92 and hashing code 94. Processor 84 includes share combination engine 88 and hashing engine 90 which are configured to execute instructions derived from share combination code 92 and hashing code 94, respectively.

During operation, processor 84 receives, via network interface, token 20 and nonce 22 from each token server 16. Processor 84 checks that each nonce 22 received is identical to the other nonces received. Processor 84 then stores each token 20 in an accessible storage device. In some arrangements, processor 84 performs a combination operation on tokens 20 to produce a combined token $T_C$, preferable by concatenating tokens $T_i$ for i∈[a,b,c,d] in order.

Hashing engine 70 applies a hash function h to random nonce 22, denoted by N to produce hashed nonce 28, i.e., h(N). In some arrangements, processor 84 concatenates h(N) with combined token $T_C$.

Sometime later, when a user (not pictured) wishes to recover secret 18', denoted by S, processor 84 sends tokens 24 and hashed nonce 28 to each token server 16. It should be understood that tokens 24 may be identical to corresponding tokens 18, i.e., $T_i$. In some arrangements, however, each token 24 is the combined token $T_C$.

Referring back to FIG. 3b, processor 64 of token server 16 receives, via network interface 62, corresponding token 24 and hashed nonce 28. In response, processor 64 compares the hashing result from hashing engine 70 to hashed nonce 28. If there is a mismatch, processor 70 sends an error message to application engine 14.

If there is a match, processor 64 performs a lookup operation on token $T_i$ in order to find the corresponding key $K_i$. In some arrangements, when processor 64 receives combined token $T_C$, processor 64 performs a token separation operation to recover the token $T_i$. Such a token separation operation is common to all token servers 16.

Token generation engine 68 then utilizes another cryptographic function, $D_f(K_i,T_i)$ to produce a new secret share 30, denoted as $D_i = D_f(K_i,T_i)$ such that, when the secret splitting operation split secret 18' (S) into products under a cyclic group G, the product of the new secret shares 30 produce secret S. That is, $S = S_a S_b S_c S_d = D_a D_b D_c D_d$, where multiplication is understood to be under G.

In some arrangements, token servers 16, via proactivization engine 72, proactively update keys at regular intervals in order to provide deeper security for the split tokenization process outlined here. That is, token servers synchronously update the keys while preserving the value of $S = D_a D_b D_c D_d$. The following represents a scheme for proactive updates in the manner described, and is described with respect to FIG. 4 below.

Figure 4:
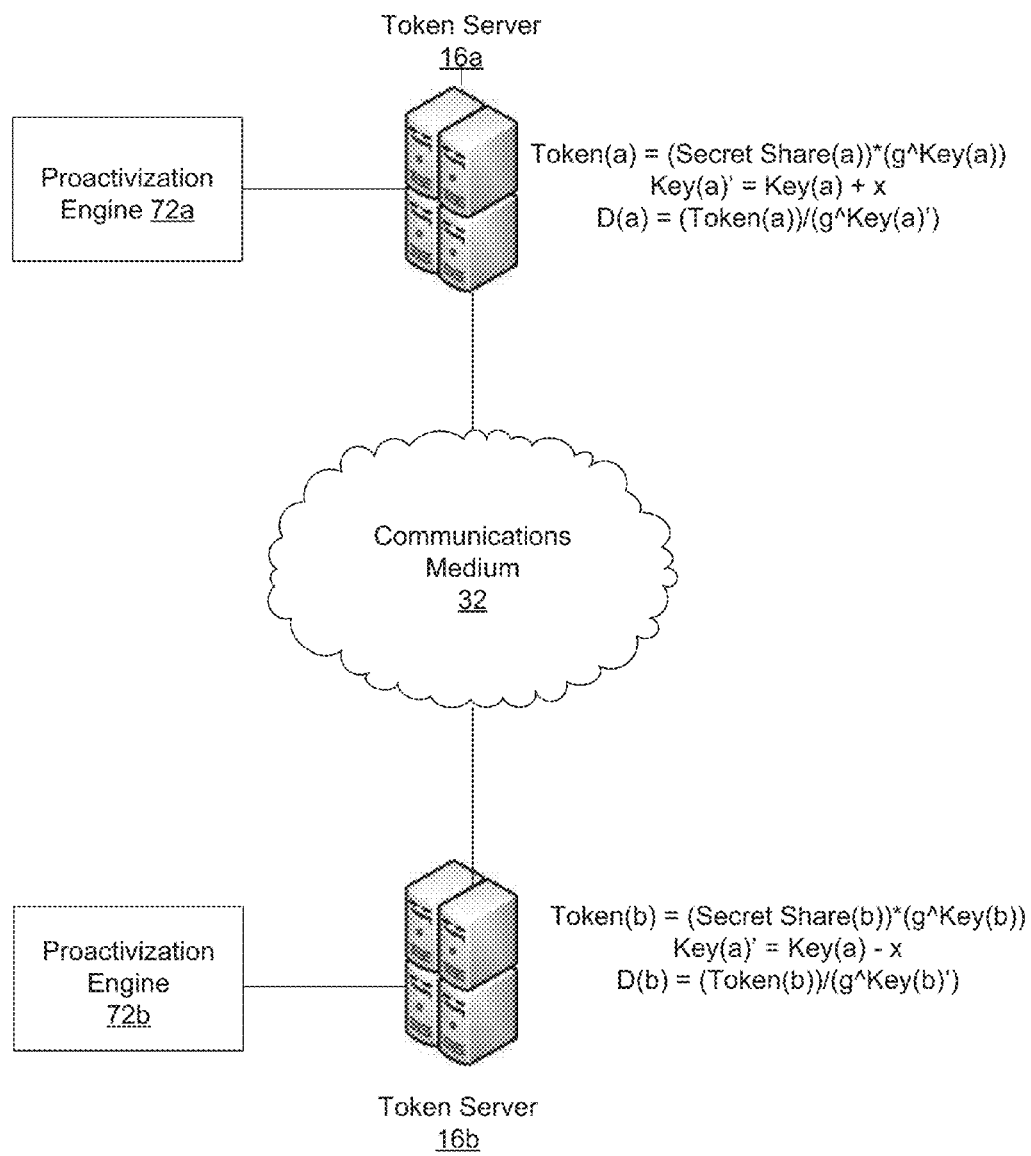
FIG. 4 is a block diagram illustrating an example proactivization engine within the token server shown in FIG. 3.

FIG. 4 represents the above scheme by which cryptographic keys used to generate tokens and secret shares are updated proactively. Consider the following tokenization function: $T_f(K_i,S_i) = S_i g^{K_i}$, where g is the generator of G. Consider further the following "share-ization" function $D_f(K_i,T_i) = T_i g^{-K_i}$ that returns a secret share $D_i$ from a token. At some point in time, token servers 16 update their respective keys by adding to each key a quantity $x_i$. Then each new share $D'_i = D_f(K_i + x_i, T_f(K_i,S_i)) = T_i g^{-K_i - x_i} = S_i g^{K_i} g^{-K_i - x_i} = S_i g^{-x_i}$, where addition is understood to be under G. The product of the new shares over the token servers is then $S_a S_b S_c S_d g^{-(x_a + x_b + x_c + x_d)}$. To recover the secret, the updates should satisfy the following condition: $x_a + x_b + x_c + x_d = 0$.

FIG. 4 illustrates a scenario in which there are two token servers, 16a and 16b, involved in the updates. In this scenario, $x_a = -x_b$. Note that proactivization engine 72 in each token server has a synchronized random number generator (not pictured) for generating such updates. In the case of four token servers above, such synchronized random number generators would follow a more complex scheme. In general, the split tokenization scheme outlined here may work with any number of token servers.

It should be understood that, in the above examples, it was assumed that there was no interaction between token servers 16. In some arrangements, however, more general cryptographic functions may be used when there is such interaction. In such a scenario, application server produces a combined token $T_C = T_a T_b T_c T_d$ and sends $T_C$ to token servers 30. A token server 16 then utilizes a "share-ization" function $D_f(K_a,K_b,K_c,K_d,T_C) = T_C g^{-[(K)_a + K_b + K_c + K_d]}$. An updating scheme as outlined above will also produce the secret 18' here as well.

It should also be understood that there are alternatives to using cryptographic functions in generating tokens from secret shares and vice-versa. For example, token server 16 may utilize tables of tokens and corresponding secret shares.

Such tables are implemented using a function $T_i = T_f(S_i)$. Such tables may be proactively updated as follows. Suppose that there are two token servers. Further suppose that each token server maintains a first skip list that stores entries $[[T]_f(S_i), h(N), S_i]$ ordered according to $T_f(S_i)$ primarily and h(N) secondarily, and a second skip list that stores entries $[[S_i, T]_f(S_i)]$ according to $S_i$. The token servers then agree on a joint random bit string $\Sigma$ and chunk size c. The first c entries in $[[S_i, T]_f(S_i)]$ in the second skip list are updated to $[[S_ji, T]_f(S_ji)] \oplus$ "Hash" $(\Sigma \| S_ji)$, where $\oplus$ represents a bitwise XOR operation. During this update, the corresponding entries $[[T]_f(S_i), h(N), S_i]$ in the first skip list are updated to $[[T]_f(S_ji) \oplus$ "Hash" $(\Sigma \| S_ji), h(N), S_ji]$ and copied to a new ordered list. Each token server 16 then replaces $\Sigma$ with a one-way function $f(\Sigma)$ and proceeds with a second chunk of c entries. Continuing along these lines for each token server 16 will result in a secure update that may be used to recover secret shares from tokens $[T_a \| T_b \| h(N)]$.

Figure 5:
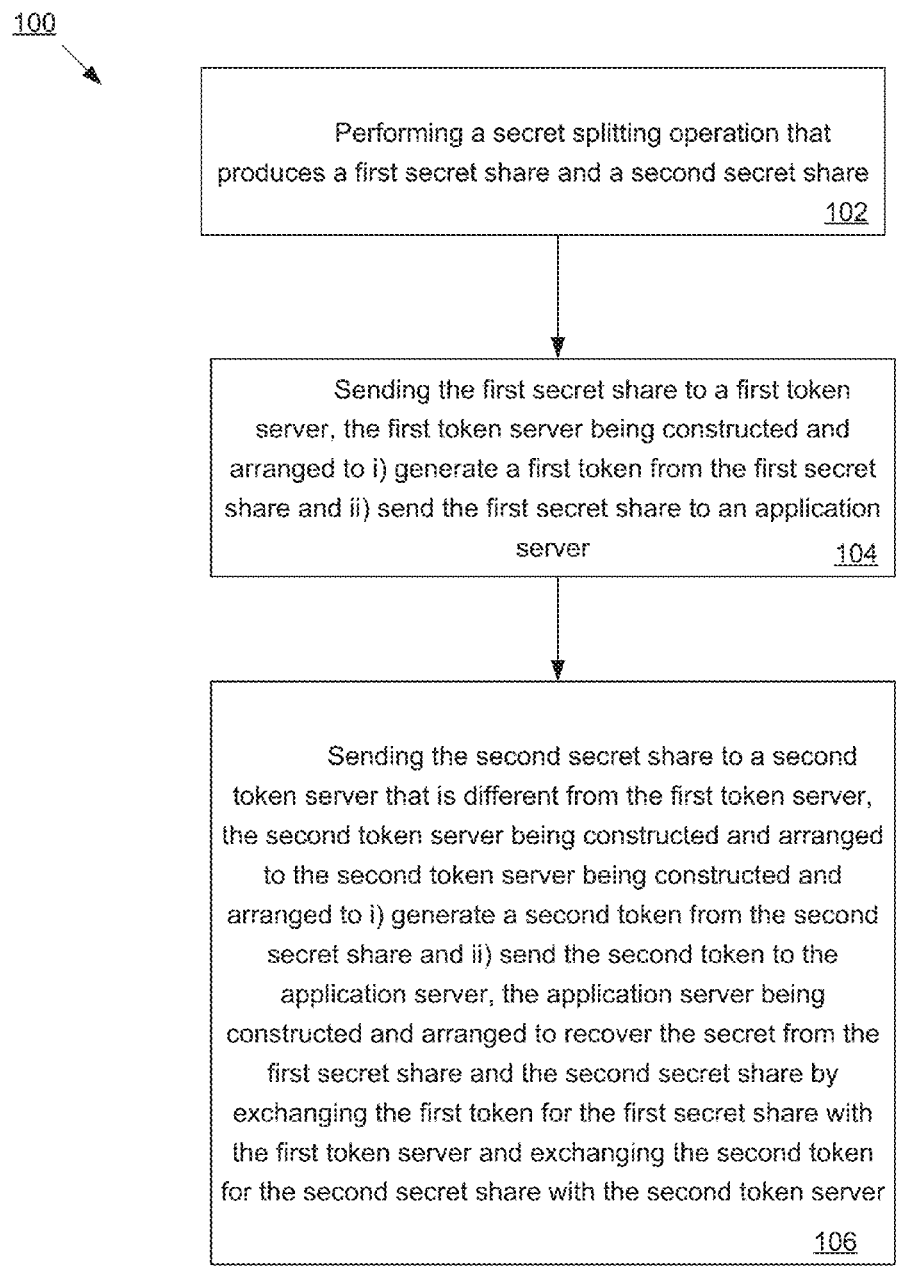
FIG. 5 is a flow chart illustrating an example variable schedule based on epochs of random length within the electronic system shown in FIG. 1.

FIG. 5 illustrates a method 100 of protecting a secret, which includes steps 102, 104, and 106. In step 102, a secret splitting operation that produces a first secret share and a second secret share is performed. In step 104, the first secret share is sent to a first token server, the first token server being constructed and arranged to i) generate a first token from the first secret share and ii) send the first token to an application server. In step 106, the second secret share is sent to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server.

Figure 6:
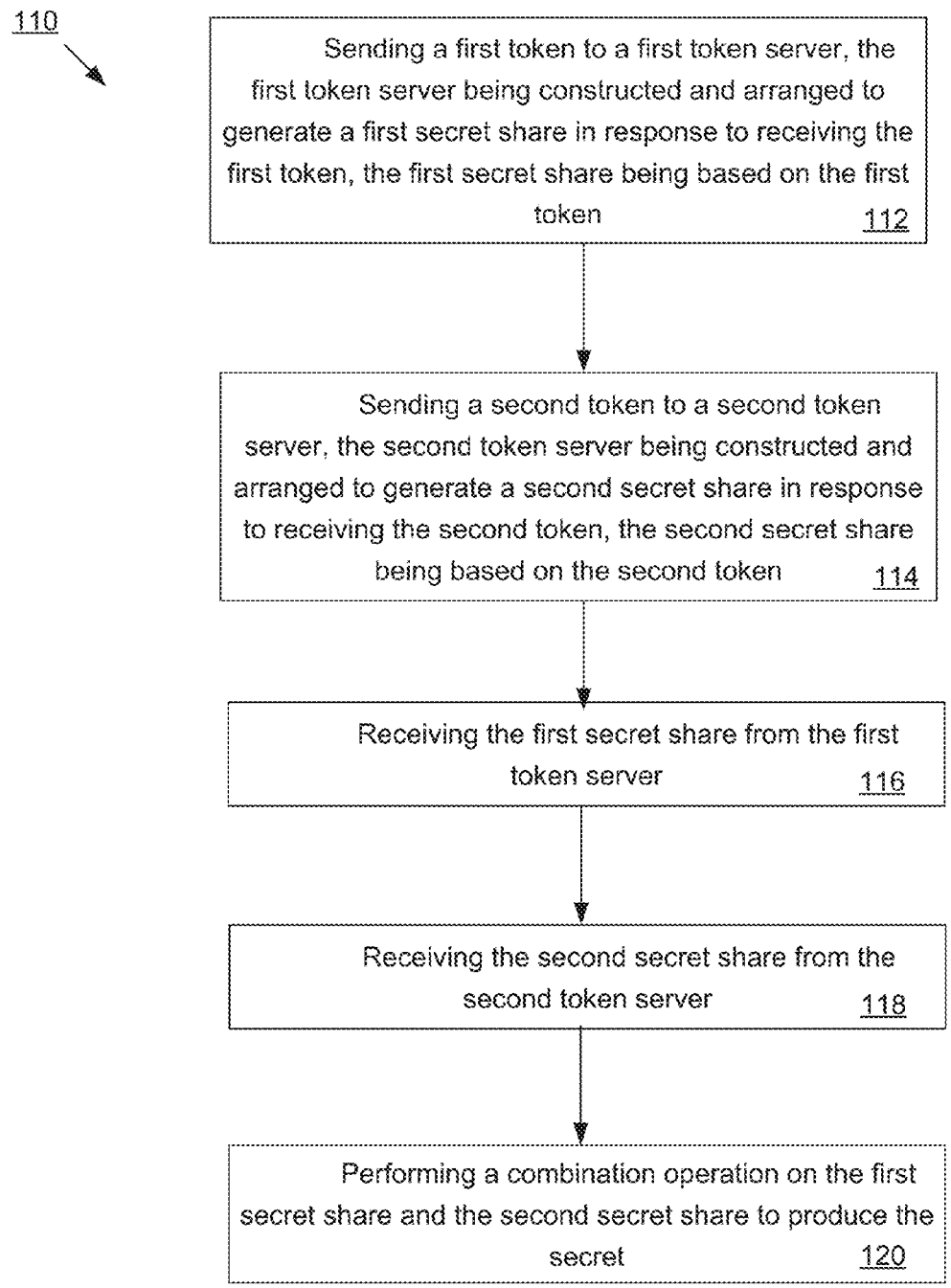
FIG. 6 is a flow chart illustrating a method of carrying out the improved technique within the electronic environment shown in FIG. 2.

FIG. 6 illustrates a method 110 of recovering a secret, which includes steps 112, 114, 116, 118, and 120. In step 112, a first token is sent to a first token server, the first token server being constructed and arranged to generate a first secret share in response to receiving the first token, the first secret share being based on the first token. In step 114, a second token is sent to a second token server, the second token server being constructed and arranged to generate a second secret share in response to receiving the second token, the second secret share being based on the second token. In step 116, the first secret share is received from the first token server. In step 118, the second secret share is received from the second token server. In step 120, a combination operation is performed on the first secret share and the second secret share to produce the secret.

While various embodiments of the invention have been particularly shown and described, it will be understood by those skilled in the art that various changes in form and details may be made therein without departing from the spirit and scope of the invention as defined by the appended claims.

For example, the examples above assumed that the secret took the form of personal credit information (PCI) such as credit card numbers. Nevertheless, the improved techniques described above are also useful for health records, insurance information, social security numbers, and other examples of PII and PHI information.

Furthermore, it should be understood that some embodiments are directed to terminal 12, which is constructed and arranged to protect a secret. Some embodiments are directed to a process of protecting a secret. Also, some embodiments are directed to a computer program product which enables computer logic to protect a secret.

Moreover, it should be understood that some embodiments are directed to application server, which is constructed and arranged to recover a secret. Some embodiments are directed to a process of recovering a secret. Also, some embodiments are directed to a computer program product which enables computer logic to recover a secret.

In some arrangements, terminal 12 is implemented by a set of processors or other types of control/processing circuitry running software. In such arrangements, the software instructions can be delivered, within terminal 12, in the form of a computer program product 130 (see FIG. 3a), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

In some arrangements, application server 14 is implemented by a set of processors or other types of control/processing circuitry running software. In such arrangements, the software instructions can be delivered, within application server 14, in the form of a computer program product 150 (see FIG. 3c), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

In some arrangements, token server 16 is implemented by a set of processors or other types of control/processing circuitry running software. In such arrangements, the software instructions can be delivered, within token server 16, in the form of a computer program product 140 (see FIG. 3b), each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of protecting a secret, the method comprising:
    performing a secret splitting operation that produces a first secret share and a second secret share;
    sending the first secret share to a first token server, the first token server being constructed and arranged to i) generate a first token from the first secret share and ii) send the first token to an application server; and
    sending the second secret share to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server,
    wherein sending the first secret share to the first token server causes the first token server to generate the first token and send the first token to the application server, and wherein sending the second secret share to the second token server causes the second token server to generate the second token and send the second token to the application server.

2. A method as in claim 1,
wherein performing the splitting operation includes:
obtaining a random number from a random number generator,
producing the first secret share from the random number, and
generating the second secret share from the secret and the first secret share, an exclusive or operation performed on the first secret share and the second secret share producing the secret.

3. A method as in claim 2,
wherein sending the first secret share to the first token server includes:
performing an encryption operation on the first secret share using a first public key to produce an encrypted first secret share, the first token server being constructed and arranged to decrypt the encrypted first secret share using a first private key that had been generated with the first public key, and
performing the encryption operation on the second secret share using a second public key to produce an encrypted second secret share, the second public key being different from the first public key, the second token server being constructed and arranged to decrypt the encrypted second secret share using a second private key that had been generated with the second public key.

4. A method as in claim 3, further comprising:
generating a random nonce from the random number generator;
wherein sending the first secret share to the first token server further includes:
performing the encryption operation on the random nonce using the first public key to produce a first encrypted random nonce, and
transmitting the first encrypted random nonce to the first token server; and
wherein sending the second secret share to the second token server further includes:
performing the encryption operation on the random nonce using the second public key to produce a second encrypted random nonce, and
transmitting the second encrypted random nonce to the second token server, the random nonce enabling the application server to verify that the secret is recoverable from the first secret share and the second secret share.

5. A method as in claim 4, further comprising:
obtaining an address of the application server;
wherein sending the first secret share to the first token server further includes:
performing the encryption operation on the address using the first public key to produce a first encrypted address, and
transmitting the first encrypted address to the first token server; and
wherein sending the second secret share to the second token server further includes:
performing the encryption operation on the address using the second public key to produce a second encrypted address, and
transmitting the second encrypted address to the second token server.

6. A method as in claim 2,
wherein the first token server is further constructed and arranged to use a first key to generate the first token from the first secret share, and the second token server is further constructed and arranged to use a second key to generate the second token from the second secret share;
wherein the first token server and the second token server are further constructed and arranged to generate a shared key offset;
wherein sending the first secret share to the first token server includes:
sending a command to generate the shared key offset to the first token server;
wherein sending the second secret share to the second token server includes:
sending a command to generate the shared key offset to the second token server; and
wherein during a proactivization step, the first token server is further constructed and arranged to produce a new first token with a new first key which is the sum of the first key and the shared key offset, and the second token server is further constructed and arranged to produce a new second token with a new second key which is the difference between the second key and the shared key offset.

7. A method as in claim 6,
wherein the first token server and the second token server are further constructed and arranged to jointly generate a joint quantity based on the new first key upon receipt of a message, the new second key, and a combined token that is based on the first token and the second token, the joint quantity being equal to the product of the first secret share and the second secret share;
wherein transmitting the key offset to the first token server includes:
sending the message to the first token server; and
wherein transmitting the key offset to the second token server includes:
sending the message to the second token server.

8. A method as in claim 6,
wherein the first token server is further constructed and arranged to generate a first quantity based on the new first key and first token, and the second token server is further constructed and arranged to compute a second quantity based on the new second key and second token, the product of the new first quantity and the second new quantity being equal to the product of the first secret share and the second secret share;
wherein sending the command to generate the shared key offset to the first token server includes:
transmitting a message to the first token server to compute the first quantity; and
wherein sending the command to generate the shared key offset to the second token server includes:
transmitting a message to the second token server to compute the second quantity.

9. A method as in claim 8,
wherein the generation of the first token involves a product within a finite cyclic group having a generator of the secret and the generator raised to the power of the first key, and the generation of the second token involves a product within the finite cyclic group of the secret and the generator raised to the power of the second key;
wherein the generation of the first quantity involves a product within the finite cyclic group of the first token and an inverse of the generator raised to the power of the first key, and the generation of the second quantity involves a product within the finite cyclic group of the second token and an inverse of the generator raised to the power of the second key;

wherein sending the command to generate the shared key offset to the first token server further includes:

including in the message to the first token server another command to proactively take the power of the generator to the new first key as the new first key replaces the first key; and wherein sending the command to generate the shared key offset to the second token server further includes:

including in the message to the second token server another command to proactively take the power of the generator to the new second key as the new second key replaces the second key.

10. A method as in claim 1, further comprising:

performing, by the first token server, a tokenization operation which replaces the first secret share with the first token, the tokenization operation concealing the first secret share; and performing, by the second token server, another tokenization operation which replaces the second secret share with the second token, the other tokenization operation concealing the second secret share.

11. A method of recovering a secret, the method comprising:

sending a first token to a first token server, the first token server being constructed and arranged to generate a first secret share in response to receiving the first token, the first secret share being based on the first token;

sending a second token to a second token server, the second token server being constructed and arranged to generate a second secret share in response to receiving the second token, the second secret share being based on the second token;

receiving the first secret share from the first token server;

receiving the second secret share from the second token server; and performing a combination operation on the first secret share and the second secret share to produce the secret, wherein the method further comprises:

in response to receiving the first token, retrieving, by the first token server, a corresponding first key from a first lookup table stored in a first storage device, the first storage device storing tokens and corresponding keys in entries of the lookup table;

in response to receiving the second token, retrieving, by the second token server, a corresponding second key from a second lookup table stored in a second storage device, the second storage device storing tokens and corresponding keys in entries of the lookup table;

generating, by the first token server, the first secret share based on the first token and the corresponding first key; and generating, by the second token server, the second secret share based on the second token and the corresponding second key.

12. A method as in claim 11, wherein performing the combination operation includes:

forming the product of the first secret share and the second secret share.

13. A method as in claim 11, further comprising applying a hash function to a nonce value to produce a hashed nonce, the nonce value having been received from both the first token server and the second token server to verify that the secret is recoverable from the first secret share and the second secret share;

wherein sending the first token to the first token server includes:

transmitting the hashed nonce to the first token server, the first token server being further constructed and arranged to i) receive the nonce value from a terminal that generated the nonce value, ii) apply the hash function to the nonce value to produce a hashed value, and iii) compare the hashed value to the received hashed to verify whether the first token was sent by the terminal; and wherein sending the second token to the second token server includes:

transmitting the hashed nonce to the second token server, the second token server being further constructed and arranged to i) receive the nonce value from a terminal that generated the nonce value, ii) apply the hash function to the nonce value to produce a hashed value, and iii) compare the hashed value to the received hashed to verify whether the second token was sent by the terminal.

14. A method as in claim 11, further comprising:

receiving the first token from the first token server;

receiving the second token from the second token server; and performing another combination operation on the first token and the second token to produce a combined token, the first token and the second token being required to be recovered from the combined token before being sent to the first token server and the second token server, respectively.

15. A method as in claim 14, wherein performing the other combination operation on the first token and the second token includes:

forming the product of the first token and the second token.

16. An electronic system constructed and arranged to protect a secret, the system comprising:

a terminal;

a first token server;

a second token server that is different from the first token server; and an application server;

the terminal including:

a network interface;

memory; and a controller including controlling circuitry coupled to the memory, the controlling circuitry being constructed and arranged to:

perform a secret splitting operation that produces a first secret share and a second secret share;

send the first secret share to the first token server, the first token server being constructed and arranged to i) generate a first token from the first secret share and ii) send the first token to an application server; and send the second secret share to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server, wherein the controlling circuitry, when sending the first secret share to the first token server, causes the first token server to generate the first token and send the first token to the application server, and wherein the controlling circuitry, when sending the second secret share to the second token server, causes the second token server to generate the second token and send the second token to the application server.

17. A system as in claim 16, wherein performing the splitting operation includes:

obtaining a random number from a random number generator, producing the first secret share from the random number, and generating the second secret share from the secret and the first secret share, an exclusive or operation performed on the first secret share and the second secret share producing the secret.

18. A system as in claim 17, wherein sending the first secret share to the first token server includes:

performing an encryption operation on the first secret share using a first public key to produce an encrypted first secret share, the first token server being constructed and arranged to decrypt the encrypted first secret share using a first private key that had been generated with the first public key, and performing the encryption operation on the second secret share using a second public key to produce an encrypted second secret share, the second public key being different from the first public key, the second token server being constructed and arranged to decrypt the encrypted second secret share using a second private key that had been generated with the second public key.

19. A system as in claim 18, further comprising:

generating a random nonce from the random number generator;

wherein sending the first secret share to the first token server further includes:

performing the encryption operation on the random nonce using the first public key to produce a first encrypted random nonce, and transmitting the first encrypted random nonce to the first token server; and wherein sending the second secret share to the second token server further includes:

performing the encryption operation on the random nonce using the second public key to produce a second encrypted random nonce, and transmitting the second encrypted random nonce to the second token server, the random nonce enabling the application server to verify that the secret is recoverable from the first secret share and the second secret share.

20. A system as in claim 19, further comprising:

obtaining an address of the application server;

wherein sending the first secret share to the first token server further includes:

performing the encryption operation on the address using the first public key to produce a first encrypted address, and transmitting the first encrypted address to the first token server; and wherein sending the second secret share to the second token server further includes:

performing the encryption operation on the address using the second public key to produce a second encrypted address, and transmitting the second encrypted address to the second token server.

21. A computer program product having a non-transitory, computer-readable storage medium which stores code to protect a secret, the code including instructions to:

perform a secret splitting operation that produces a first secret share and a second secret share;

send the first secret share to the first token server, the first token server being constructed and arranged to i) generate a first token from the first secret share and ii) send the first token to an application server; and send the second secret share to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server, wherein the code includes further instructions to, when the first secret share is sent to the first token server, cause the first token server to generate the first token and send the first token to the application server, and wherein the code includes further instructions to, when the second secret share is sent to the second token server, cause the second token server to generate the second token and send the second token to the application server.

22. A method of protecting a secret, the method comprising:

performing a secret splitting operation that produces a first secret share and a second secret share;

sending the first secret share to a first token server, the first token server being constructed and arranged to i) generate a first token from the first secret share and ii) send the first token to an application server; and sending the second secret share to a second token server that is different from the first token server, the second token server being constructed and arranged to i) generate a second token from the second secret share and ii) send the second token to the application server, the application server being constructed and arranged to recover the secret from the first secret share and the second secret share by exchanging the first token for the first secret share with the first token server and exchanging the second token for the second secret share with the second token server;

wherein the first token server is further constructed and arranged to use a first key to generate the first token from the first secret share, and the second token server is further constructed and arranged to use a second key to generate the second token from the second secret share;

wherein the first token server and the second token server are further constructed and arranged to generate a shared key offset;

wherein sending the first secret share to the first token server includes:

sending a command to generate the shared key offset to the first token server;
wherein sending the second secret share to the second token server includes:
sending a command to generate the shared key offset to the second token server; and
wherein during a proactivization step, the first token server is further constructed and arranged to produce a new first token with a new first key which is the sum of the first key and the shared key offset, and the second token server is further constructed and arranged to produce a new second token with a new second key which is the difference between the second key and the shared key offset,
wherein sending the first secret share to the first token server causes the first token server to generate the first token and send the first token to the application server, and
wherein sending the second secret share to the second token server causes the second token server to generate the second token and send the second token to the application server.

\* \* \* \* \*